United States Patent [19]
Watanabe et al.

[11] Patent Number: 5,637,627
[45] Date of Patent: Jun. 10, 1997

[54] METHOD FOR PRODUCING A SPHERICAL ION EXCHANGE RESIN

[75] Inventors: Junya Watanabe, Tokyo; Tsunehiko Kurata, Yokohama, both of Japan

[73] Assignee: Mitsubishi Chemical Corporation, Tokyo, Japan

[21] Appl. No.: 603,093

[22] Filed: Feb. 20, 1996

Related U.S. Application Data

[63] Continuation of Ser. No. 314,271, Sep. 30, 1994, abandoned, which is a continuation-in-part of Ser. No. 163,542, Dec. 9, 1993, abandoned.

[30] Foreign Application Priority Data

Dec. 10, 1992 [JP] Japan .................................. 4-330467

[51] Int. Cl.$^6$ .............................. C08F 8/36; C08F 8/32; C08F 4/36
[52] U.S. Cl. ........................... 521/33; 521/32; 525/344; 525/353; 525/354; 525/355; 525/359.1; 525/379; 525/380; 526/232.3; 526/232.5; 526/227
[58] Field of Search ........................................ 526/232.5

[56] References Cited

U.S. PATENT DOCUMENTS

| | | |
|---|---|---|
| 3,585,176 | 6/1971 | Gerritsen et al. . |
| 4,283,499 | 8/1981 | Howell . |
| 4,560,735 | 12/1985 | Nakagawa et al. . |
| 4,618,663 | 10/1986 | Nakagawa . |
| 5,185,405 | 2/1993 | Nishida . |
| 5,191,040 | 3/1993 | Okumura .................. 526/65 |
| 5,254,650 | 10/1993 | Fukumura .................. 526/232.3 |

FOREIGN PATENT DOCUMENTS

| | | |
|---|---|---|
| 0501288 | 9/1992 | European Pat. Off. . |
| 1020297 | 2/1966 | United Kingdom ................. 526/232.3 |

OTHER PUBLICATIONS

Macromolecules, 1993, vol. 26, pp. 2246–2252, R.F. Drumright, et al., "Cycloalkane Perketal Initiators for Styrene Polymerization. 1. Decomposition Chemistry of 1,1-Bis-(tert-Butylpmeroxy) Cyclohexane".

Macromolecules, 1993, vol. 26, pp. 2253–2258, R.E. Drumright, et al., "Cycloalkane Perketal Initiators for Styrene Polymerization. 2. Decomposition Chemistry of gem-BIS-(tert-Butylperoxy) Cycloalkanes".

*Primary Examiner*—Fred Zitomer
*Attorney, Agent, or Firm*—Oblon, Spivak, McClelland, Maier & Neustadt, P.C.

[57] ABSTRACT

A method for producing a spherical crosslinked copolymer, which comprises polymerizing a monofunctional addition-polymerizable monomer and at least 0.5% by weight of a polyfunctional addition-polymerizable monomer on the basis of the total weight of monomers by suspension polymerization in an aqueous medium in the presence of a radical polymerization initiator of the following formula (b) which has a decomposition temperature for a half-life period of 10 hours within a range of from 60° to 120° C. and which is capable of forming at least four radical initiating points per molecule by the decomposition:

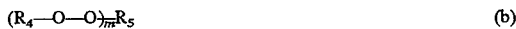

$$(R_4-O-O)_m R_5 \qquad (b)$$

wherein $R_4$ is a linear or branched $C_{1-10}$ alkyl group, $R_5$ is a m-valent $C_{4-25}$ hydrocarbon group, and m is an integer of at least 2, wherein the plurality of $R_4$ per molecule may be the same or different.

9 Claims, No Drawings

METHOD FOR PRODUCING A SPHERICAL ION EXCHANGE RESIN

This application is a continuation of application Ser. No. 08/314,271, filed on Sep. 30, 1994, now abandoned, which is a Continuation-in-Part of application Ser. No. 08/163,542, filed on Dec. 9, 1993, now abandoned.

The present invention relates to a method for producing an ion exchange resin and a spherical crosslinked copolymer as the base material for the ion exchange resin. Particularly, the present invention relates to an ion exchange resin which is spherical and excellent in the physical and mechanical strength.

Ion exchange resins are widely used in various industrial fields including a field of water treatment. Spherical ion exchange resins are commonly used, for example, in a field of water treatment such as demineralization of water for boilers or condensate treatment at power plants, in a food field such as purification of a sugar solution or purification of an amino acid, in a pharmaceutical field such as purification of an antibiotic, in a field of super pure water for preparation of semiconductors, or in an analytical filed such as chromatography.

For the production of spherical ion exchange resins, suspension polymerization has been used (see Hojo et al., "Ion Exchange Resins-Chelate Resins", p. 127–206 and a section entitled "Synthetic Ion Exchange Resins" at page 189 of "Ion Exchangers" compiled by Konrad Dorfner and published in 1990 by WALTER de Gruyter & Co.).

According to such a method, a monomer mixture comprising a monofunctional addition-polymerizable monomer and a polyfunctional addition-polymerizable monomer and a radical polymerization initiator are added to an aqueous medium, followed by stirring to prepare a suspension of the monomer mixture, which is then maintained at a polymerization temperature for a predetermined period of time to obtain a spherical crosslinked copolymer. As the polymerization initiator, an organic peroxide such as benzoyl peroxide, cumyl peroxide or lauroyl peroxide, or an azo compound such as azobisisobutylonitrile or azobisvaleronitrile, is commonly employed.

Ion exchange groups are introduced to such a crosslinked copolymer by a conventional method to obtain a spherical ion exchange resin. For example, a sulfonic acid type strongly acidic cation exchange resin can be obtained by reacting a sulfonating agent such as concentrated sulfuric acid, chlorosulfonic acid or fuming sulfuric acid to the crosslinked copolymer. Further, a weakly basic to strongly basic anion exchange resin can be obtained by haloalkylating the crosslinked copolymer by reacting chloromethyl methyl ether thereto in the presence of a Lewis acid, followed by reacting a primary to tertiary amine thereto.

One of problems with these methods is that when ion exchange groups are introduced into a spherical crosslinked copolymer or when the spherical crosslinked copolymer is used in treating water or the like, the spherical crosslinked copolymer is likely to break or undergo cracking due to chemical or physical impacts.

One of methods for solving such a problem at the time of introducing ion exchange groups, is to conduct the introduction of ion exchange groups under a mild condition as far as possible to prevent formation of a substantial strain in the crosslinked copolymer. Another method is to produce a crosslinked copolymer having high strength, which is durable against a strain formed during the introduction of ion exchange groups. As such a method, a method of introducing oxygen to a polymerization atmosphere as disclosed in U.S. Pat. No. 4,192,921, or a method of employing a chain transfer additive as disclosed in GB Patent 2,244,713, may, for example, be mentioned.

U.S. Pat. No. 4,283,499 proposes a method of using a special polymerization initiator such as tert-butyl peroxy-2-ethylhexanoate. However, the physical or mechanical strength of the crosslinked copolymer obtainable by this method is not fully satisfactory although it is improved to some extent as compared with a case where a common initiator such as benzoyl peroxide is used. Namely, during the reaction for introducing various ion exchange groups in a state swelled with a solvent, many ion exchange resin particles will break due to physical swelling exerted to the crosslinked copolymer. Further, in an accelerated test wherein resin beads having ion exchange groups introduced are immersed alternately in highly concentrated acid and alkali aqueous solutions, the particles are likely to break.

WO 85/04885 discloses that resin beads having ion exchange groups introduced to a crosslinked copolymer produced by a so-called seed polymerization wherein while controlling the polymerization conversion of a monomer absorbed by seed particles, a monomer is further added, absorbed and polymerized, exhibit adequate strength against an accelerated test using highly concentrated acid and alkali aqueous solutions. However, this polymerization method is very cumbersome and has a problem that it is difficult to carry out such a method on an industrial scale.

It is an object of the present invention to obtain an ion exchange resin with adequate strength and good shape in good yield by preventing breakage or cracking of a spherical crosslinked copolymer during the introduction of ion exchange groups, by a relatively simple method of using a polymerization initiator having a certain specific chemical structure. Further, it is an object of the present invention to provide a method for producing an ion exchange resin having excellent physical strength, whereby it is possible to substantially reduce a deterioration under conditions of practical use, such as breakage due to swelling and contraction under acidic and alkaline conditions.

Thus, the present invention provides a method for producing a spherical crosslinked copolymer, which comprises polymerizing a monofunctional addition-polymerizable monomer and a polyfunctional addition-polymerizable monomer by suspension polymerization in an aqueous medium in the presence of a radical polymerization initiator of the following formula (b) which has a decomposition temperature for a half-life period of 10 hours within a range of from 60° to 120° C. and which is capable of forming at least four radical initiating points per molecule by the decomposition:

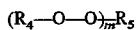 (b)

wherein $R_4$ is a linear or branched $C_{1-10}$ alkyl group, $R_5$ is a m-valent $C_{4-25}$ hydrocarbon group, and m is an integer of at least 2, wherein the plurality of $R_4$ per molecule may be the same or different.

Now, the present invention will be described in detail with reference to the preferred embodiments.

The addition-polymerizable monomers to be used for the copolymerization in the present invention may be those commonly used in the field of ion exchange resins.

The addition-polymerizable monomers include a monofunctional addition-polymerizable monomer and a polyfunctional addition-polymerizable monomer.

Examples of the monofunctional addition-polymerizable monomer include a monovinyl aromatic monomer such as styrene, alkyl-substituted styrene (particularly monoalkylsubstituted styrene, e.g. vinyltoluene and ethylvinylbenzene), halogen-substituted styrene (e.g. bromo- or chlorostyrene), or vinylnaphthalene; and an aliphatic monomer such as an acrylic or methacrylic monomer, e.g. (meth)acrylic acid, (meth)acrylate, (meth)acrylamide and acrylonitrile.

Examples of the polyfunctional addition-polymerizable monomer include a polyvinyl aromatic monomer such as divinylbenzene, divinyltoluene, divinylxylene, divinylnaphthalene, trivinylbenzene, divinyldiphenylether, divinyldiphenylsulfone, or a compound having a $C_1$–$C_3$ alkyl group substituted on the benzene ring of these polyvinyl aromatic monomers; and an aliphatic polyacrylic or polymethacrylic monomer such as alkylene di(meth)acrylate, e.g. ethylene glycol or diethylene glycol di(meth)acrylate and the like, alkylene poly(meth)acrylate, e.g. trimethylolpropane tri(meth)acrylate and the like, or alkylene poly(meth)acrylamide, e.g. N,N'-methylene di(meth)acrylamide and the like.

It is most common to employ styrene and divinylbenzene. Further, divinylbenzene commonly available for industrial use may contain a substantial amount of ethylvinylbenzene, but may be used without removing the ethylvinylbenzene.

When preparing a general ion exchange resin, the polyfunctional addition-polymerizable monomer is used usually in an amount of from 0.5 to 30% by weight, preferably from 1 to 20% by weight, based on the total amount of monomers. On the other hand, when preparing a porous spherical crosslinked copolymer used as a special resin or an adsorbent, the polyfunctional addition-polymerizable monomer is used usually in an amount of from 4 to 100% by weight based on the total amount of monomers.

As mentioned above, the polymerization initiator to be used in the present invention is a peroxyketal having a plurality of polymerization initiating points per molecule.

The integer "m" in the above formula (b) is usually at least 2, preferably from 2 to 8, most preferably from 2 to 4. The larger the integer m is, the longer the molecular chain of the resulting copolymer (the molecular chain length from the initiating point to the terminating point) is expected, such being desirable to obtain the physical and mechanical strength. However, as the integer m increases, the solubility of the polymerization initiator to the monomers, decreases. Accordingly, m is most preferably 2. Further, the polymerization initiator to be used in the present invention has a decomposition temperature for a half-life period of 10 hours within a range of from 60° to 120° C., preferably from 70° to 110° C. If this temperature is high, polymerization is required to be carried out at a high temperature, whereby the energy efficiency tends to be poor. On the other hand, if this temperature is too low, the chemical stability of the polymerization initiator deteriorates, whereby the storage stability or the operational safety tends to be low.

The polymerization initiator of the formula (b) has a plurality of peroxide bonds, which usually decompose at different temperatures, e.g. at two steps, and generate radicals at each step. In order to obtain the aimed crosslinked copolymer having an excellent strength of the present invention, it is preferable to make a temperature difference between the first stage decomposition temperature and the second stage decomposition temperature larger than 5° C., preferably larger than 10° C. In the present application, the decomposition temperature of the polymerization initiator means a decomposition temperature for a half-life period of 10 hours unless otherwise specified.

The polymerization initiator in the present invention may be used alone or in combination as a mixture.

$R_4$ in the above formula (b) is a linear or branched $C_{1-10}$ alkyl group, preferably a branched $C_{3-10}$ alkyl group. The plurality of $R_4$ present in one molecule may be the same or different. $R_5$ is a m-valent $C_{4-25}$ hydrocarbon group, preferably a m-valent $C_{6-20}$ hydrocarbon group. The m-valent $C_{6-20}$ hydrocarbon group may, for example, be a linear or cyclic $C_{6-20}$ alkylene group, a linear or cyclic $C_{6-20}$ alkylidene group, or a $C_{6-20}$ aromatic hydrocarbon group.

The polymerization initiator of the formula (b) may, for example, be cycloaliphatic peroxyketals such as 1,1-bis(tert-butyl peroxy)-2-methylcyclohexane (83° C., 100° C.), 1,1-bis(tert-butyl peroxy)-cyclohexane (91° C., 100° C.), 1,1-bis(tert-butyl peroxy)-3,3,5-trimethylcyclohexane (90° C., 100° C.), 1,1-bis(tert-hexyl peroxy)-cyclohexane (87° C., 100° C.), 1,1-bis(tert-hexyl peroxy)-3,3,5-trimethylcyclohexane (87° C., 100° C.), 1,1-bis(tert-butyl peroxy)-cyclododecane (95° C., 100° C.), 2,2-bis(4,4-di-tert-butyl peroxycyclohexyl)propane (92° C., 100° C.); straight chain peroxyketals such as 2,2-bis(tert-butyl peroxy)octane, 2,2-bis(tert-butyl peroxy)-butane (100° C., 103° C.), n-butyl 4,4-bis(tert-butyl peroxy)-valerate (100° C., 105° C.), ethyl 3,3-bis(tert-butyl peroxy)-butyrate (100° C., 110° C.).

The numerical values in the above brackets indicate decomposition temperatures for a half-life period of 10 hours of the respective polymerization initiators. The above illustrated peroxyketals generally have two different decomposition temperatures, at which two peroxide bonds in a molecule respectively decompose and generate radicals. These polymerization initiators are commercially available, for example, from manufacturers such as Nippon Oil & Fats or KAYAKU AKZO CORPORATION.

Particularly preferred polymerization initiators of the formula (b) are peroxyketals having a temperature difference of at least 10° C. between the first decomposition temperature and the second decomposition temperature, examples of which include 1,1-bis(tert-butyl peroxy)-2-methylcyclohexane (83° C., 100° C.), 1,1-bis(tert-butyl peroxy)-3,3,5-trimethylcyclohexane (90° C., 100° C.), 1,1-bis(tert-hexyl peroxy)-cyclohexane (87° C., 100° C.), 1,1-bis(tert-hexyl peroxy)-3,3,5-trimethylcyclohexane (87° C., 100° C.), and ethyl 3,3-bis(tert-butyl peroxy)butyrate (100° C., 110° C.).

The polymerization initiator is used usually in an amount of from 0.05 to 2% by weight to the polymerizable monomers.

An initiator such as benzoyl peroxide conventionally used in the preparation of a crosslinked copolymer may also be used in combination with the above illustrated initiators.

A well known method generally used for preparing a crosslinked copolymer is applicable to the polymerization process of the present invention. Thus, the polymerization is carried out by adding a monomer mixture containing a polymerization initiator to an aqueous medium having a dispersant dissolved therein, followed by stirring to form a suspension, and then maintaining the suspension at a predetermined polymerization temperature. If necessary, the monomer mixture may be discharged in the form of slender columns into an aqueous medium to form uniform droplets of the monomer mixture, which are then subjected to polymerization.

Other dispersants may be those which are commonly employed, such as xanthane gum, polydiallyldimethyl ammonium chloride, polyacrylic acid or its salt, polyacrylamide, a hydrolyzate of a styrene-maleic anhydride copolymer or its salt, carboxy methyl cellulose, hydroxyalkyl cellulose, methyl cellulose, ethyl cellulose, polyvinyl alcohol, and gelatin. Further, if necessary, an alkali or a buffering salt such as a borate may be added to maintain the pH to a proper level. In a case where a water-soluble monomer such as acrylamide is used, it is preferred to add sodium chloride or calcium chloride to lower the water-solubility.

The volume ratio of the addition-polymerizable monomer mixture to the aqueous medium is usually from 1:10 to 1:2, and it is preferred to use the aqueous medium in a larger amount. Usually, the larger the ratio of the aqueous medium is, the more stable the suspension becomes.

The polymerization temperature is selected by taking the type of an initiator, a crosslinking degree (i.e. the proportion of a polyfunctional addition-polymerizable monomer used) and the like, into consideration, but is generally from 50° C. to 150° C. The polymerization temperature may be initiated at a relatively low temperature, and the temperature may gradually or stepwise be raised. Preferably, the polymerization reaction is initiated at a temperature between the first decomposition temperature and the second decomposition temperature, and is terminated at a temperature elevated higher than the second decomposition temperature.

If desired, a porous crosslinked polymer can be prepared by known methods, for example, by a method comprising adding an appropriate diluent to a monomer mixture, polymerizing the mixture and obtaining a porous structure by making phase separation between the diluent and a polymer produced during the polymerization reaction, or a method comprising mixing a linear polymer such as polystyrene, polymethylstyrene or polymethyl acrylate with a monomer mixture, polymerizing the resultant mixture and removing the linear polymer from a spherical polymer thus obtained, by extraction with an appropriate solvent.

To the spherical crosslinked copolymer obtained by the suspension polymerization as described above, ion exchange groups may then be introduced by any conventional method to obtain an ion exchange resin such as an anion exchange resin, a cation exchange resin, or a chelate resin.

A typical method for introducing ion exchange groups will be described. The crosslinked copolymer is swelled by an addition of a swelling agent such as dichloroethane and then a sulfonating agent such as concentrated sulfuric acid, chlorosulfonic acid or fuming sulfuric acid is reacted thereto to obtain a sulfonic acid type strongly acidic cation exchange resin. The temperature for the sulfonation reaction is usually from room temperature to 150°. The swelling agent may be a halogenated hydrocarbon such as dichloropropane or chloroform, or an aromatic compound such as benzene, toluene or nitrobenzene, in addition to the above-mentioned dichloroethane.

After the sulfonation reaction, a sulfonating agent such as concentrated sulfuric acid is diluted with water to remove the sulfonating agent. However, during the dilution, crosslinked copolymer beads are swollen and are sometimes broken or cracked. In order to avoid such a rapid swelling of beads as to cause breaking or cracking, the sulfonating agent may be gradually diluted by such a mild method as shown in Example 1 of U.S. Pat. No. 4,767,850 wherein the sulfonating agent is gradually diluted by adding a dilute sulfuric acid having a lower concentration.

A strongly basic anion exchange resin can be obtained by reacting chloromethylmethyl ether for chloromethylation in the presence of a Lewis acid such as aluminum chloride or zinc chloride instead of the sulfonating agent, and then reacting a tertiary amine such as trimethylamine or dimethylethanolamine thereto. As the Lewis acid as a catalyst for the chloromethylation reaction, ferric chloride, boron trifluoride, titanium tetrachloride, stanic chloride or aluminum bromide may, for example, be used also. The Lewis acid is used usually in an amount of from 0.02 to 2 parts by weight per part by weight of the crosslinked copolymer. The chloromethylation reaction is carried out usually at a temperature of from 30° to 60° C. for from 2 to 20 hours. For the amination of the chloromethyl groups, the amine is used in an amount of from 1 to 30 mols per mol of the chloromethyl groups introduced to the crosslinked copolymer.

As described above, it is possible to obtain ion exchange resin beads by introducing functional groups to the spherical crosslinked copolymer of the present invention comprising at least repeating units derived from a monofunctional addition-polymerizable monomer and repeating units derived from a polyfunctional addition-polymerizable monomer.

Such resin beads have excellent physical and mechanical strength. For example, they are excellent in the osmotic shock, particularly the physical swelling strength exerted to the crosslinked copolymer during the reaction for introducing various ion exchange groups in a state swelled with a solvent. Accordingly, it is possible to minimize the breakage or cracking of beads during the introduction of ion exchange groups, and thus it is possible to obtain crack-free ion exchange resin beads in good yield.

With the spherical ion exchange resin of the present invention, the proportion of ion exchange resin particles remaining as perfect beads (i.e. the retention of perfect bead shape) after a cycle test of contacting a 8N sulfuric acid aqueous solution and a 8N sodium hydroxide aqueous solution alternately to the spherical resin for 10 cycles, is at least 90% in the case of a strongly acidic cation exchange resin or at least 70% in the case of a strongly basic anion exchange resin.

The ion exchange resin of the present invention is scarcely susceptible to breakage even when subjected to regeneration and loading repeatedly, and thus is capable of minimizing an increase of pressure loss of the ion exchange resin bed.

When the resin beads having ion exchange groups introduced to the spherical crosslinked copolymer obtained by the present invention, are swelled with water, a difference in the distribution of the water content is observed between the peripheral portions and the center portions of the gel-like resin beads thus swelled. For example, when a dye having a large molecular weight and a large molecular volume is impregnated to the ion exchange resin obtained by the method of the present invention, a difference in the penetration rate to the interior of the gel is observed as compared with a commercially available resin having a relatively high strength. Namely, the spherical ion exchange resin of the present invention has a particle structure such that in a dyeing test of impregnating a dye to particles of the ion exchange resin, the particles are dyable at their peripheral portions and not dyable at their center portions. When the center portion to which the dye has not penetrated within a unit time, is defined as a core, and the peripheral portion dyed by the dye is defined as a shell, it is one of the features of the spherical ion exchange resin of the present invention that it comprises core and shell portions.

The dye to be used here, is selected depending upon the proportion of the polyfunctional addition-polymerizable monomer. When the charged proportion of the polyfunctional addition-polymerizable monomer is from 6 to 10% by weight, i.e. when the water content is from 40 to 55%, a dye having a molecular weight of about 500 is preferred.

According to the present invention, an ion exchange resin having very high strength and excellent spherical shape can easily be obtained. The ion exchange resin obtained by the present invention is scarcely susceptible to breakage even when subjected to regeneration and loading repeatedly, whereby it is possible to minimize an increase of pressure loss of the ion exchange bed.

Now, the present invention will be described in further detail with reference to Examples. However, it should be understood that the present invention is by no means restricted to such specific Examples. In the following Examples, "parts" means "parts by weight". Further, the particle sizes of the obtained crosslinked copolymers were about 0.5 mm.

EXAMPLE 1

A monomer mixture comprising 84 parts of styrene, 16 parts of divinylbenzene for industrial use (purity: 55%), and 0.6 part of di-tert-butyl peroxyhexahydrophthalate, was added to 400 parts of deionized water having 0.5 parts of polyvinyl alcohol dissolved therein, followed by stirring for one hour to obtain a suspension. Then, the suspension was heated and reacted at 80° C. for 8 hours. The resulting spherical crosslinked copolymer was thoroughly washed with water to remove the dispersant, followed by vacuum drying at 50° C. for 5 hours. 40 parts of dichloroethane was added to 20 parts of the spherical crosslinked copolymer thus obtained, and the mixture was maintained at room temperature for one hour for swelling. Then, 240 parts of concentrated sulfuric acid was added thereto, and the mixture was reacted at 70° C. for 8 hours. Then, 500 parts of deionized water was added thereto over a period of 5 hours to dilute concentrated sulfuric acid, followed by filtration. The sulfonic acid type strongly acidic cation exchange resin thus obtained, was heated to remove dichloroethane and then packed into a column, whereupon a 2N sodium hydroxide aqueous solution was permitted to flow therethrough. Then, purified water was permitted to flow for cleaning to obtain a Na-type strongly acidic cation exchange resin. The physical properties of this resin are shown in Table 1.

EXAMPLE 2

Polymerization and sulfonation were carried out in the same manner as in Example 1 except that a monomer mixture comprising 92 parts of styrene, 8 parts of divinylbenzene for industrial use (purity: 55%) and 0.6 part of di-tert-butyl peroxyhexahydrophthalate, was used, to obtain a strongly acidic cation exchange resin. The physical properties of this resin are shown in Table 1.

COMPARATIVE EXAMPLE 1

Polymerization and sulfonation were carried out in the same manner as in Example 1 except that benzoyl peroxide was used instead of the di-tert-butyl peroxyhexahydroterephthalate, to obtain a strongly acidic cation exchange resin. The physical properties of this resin are shown in Table 1.

COMPARATIVE EXAMPLE 2

Polymerization and sulfonation were carried out in the same manner as in Example 2 except that benzoyl peroxide was used instead of the di-tert-butyl peroxyhexahydroterephthalate, to obtain a strongly acidic cation exchange resin. The physical properties of this resin are shown in Table 1.

COMPARATIVE EXAMPLE 3

Polymerization and sulfonation were carried out in the same manner as in Example 1 except that tert-butyl peroxy-2-ethylhexanoate was used instead of the di-tert-butyl peroxyhexahydroterephthalate, to obtain a strongly acidic cation exchange resin. The physical properties of this resin are shown in Table 1.

TABLE 1

| | Water content (%) | Ion exchange capacity (meq/g) | Ion exchange capacity (meq/ml) | Perfect beads (%) | Cracked beads (%) | Broken beads (%) |
| --- | --- | --- | --- | --- | --- | --- |
| Example 1 | 51.5 | 4.73 | 1.85 | 100 | 0 | 0 |
| Example 2 | 64.1 | 4.76 | 1.31 | 100 | 0 | 0 |
| Comparative Example 1 | 49.7 | 4.69 | 1.97 | 82 | 11 | 7 |
| Comparative Example 2 | 64.1 | 4.73 | 1.31 | 78 | 16 | 6 |
| Comparative Example 3 | 50.5 | 4.67 | 1.89 | 88 | 10 | 2 |

For the determination of the perfect beads, the cracked beads and the broken beads, each ion exchange resin was dispersed and a microscopic photograph (25 magnifications) was taken, whereupon the configuration of beads in an area containing about 300 particles was visually evaluated.

EXAMPLE 3

The ion exchange resin obtained in Example 1 and commercially available typical strongly acidic cation exchange resins made of a styrene-divinylbenzene type resins having substantially the same level of water content i.e. Diaion® SK1B (water content: 46%), manufactured by Mitsubishi Kasei Corporation and Dowex® 650° C. (water content: 42%), manufactured by Dow Chemical Company were classified into particle sizes of from 610 µm to 700 µm, respectively, in the form of sodium salt, and 6 ml of each resin was sampled. Each sample was packed into a column and subjected to a cycle test of passing a 8N sulfuric acid aqueous solution and a 8N sodium hydroxide aqueous solution alternately therethrough for 10 cycles. The periods of time for passing liquids were as follows:

| 1) 8N sulfuric acid aqueous solution | 2 minutes |
| 2) Deionized water | 1 minute |
| 3) 8N sodium hydroxide aqueous solution | 2 minutes |
| 4) Deionized water | 1 minute |

The flow rate was a space velocity SV=5.

The proportions of the perfect beads, the cracked beads and the broken beads were compared as between before and after the test. The results are shown in Table 2.

TABLE 2

|  | Example 1 | Diaion SK1B | Dowex 650C |
|---|---|---|---|
| Before the test | | | |
| Perfect beads (%) | 100 | 99 | 97 |
| Cracked beads (%) | 0 | 1 | 3 |
| Broken beads (%) | 0 | 0 | 0 |
| After the test | | | |
| Perfect beads (%) | 89 | 32 | 12 |
| Cracked beads (%) | 8 | 36 | 20 |
| Broken beads (%) | 3 | 32 | 68 |

EXAMPLE 4

A monomer mixture comprising 84 parts of styrene, 16 parts of divinylbenzene for industrial use (purity: 56.5%), and 0.23 part of 1,1-bis(t-butyl peroxy)-2-methylcyclohexane, was added to 300 parts of deionized water having 0.5 part of polyvinyl alcohol dissolved therein, followed by stirring for 10 minutes to obtain a suspension. Then, the suspension was heated and reacted at 80° C. for 8 hours. The resulting spherical crosslinked copolymer was thoroughly washed with water to remove the dispersant. 30 parts of the spherical crosslinked copolymer thus obtained was sulfonated with 210 parts of concentrated sulfuric acid, and the concentrated sulfuric acid was then diluted gradually with 145 parts of 40% dilute sulfuric acid and 186 parts of 15% dilute sulfuric acid, and further with 455 parts of deionized water, and was removed. The resultant spherical crosslinked polymer was finally washed with water. The diluting and removing operations were gradually conducted over 13 hours. The sulfonic acid type strongly acidic cation exchange resin thus obtained, was then packed into a column, whereupon a 2N sodium hydroxide aqueous solution was permitted to flow therethrough. Then, deionized water was permitted to flow for cleaning to obtain a Na-type strongly acidic cation exchange resin. The physical properties of this resin are shown in Table 3.

EXAMPLE 5

Polymerization and sulfonation were carried out in the same manner as in Example 4, except that the monomer mixture suspension was heated at 85° C. for 8 hours to obtain a strongly acidic cation exchange resin. The physical properties of this resin are shown in Table 3.

EXAMPLE 6

Polymerization and sulfonation were carried out in the same manner as in Example 4, except that a monomer mixture suspension using 0.12 part of 1,1-bis(t-butyl peroxy)-2-methylcyclohexane as an initiator was heated at 85° C. for 8 hours to obtain a strongly acidic cation exchange resin. The physical properties of this resin are shown in Table 3.

EXAMPLE 7

Polymerization and sulfonation were carried out in the same manner as in Example 4, except that a monomer mixture suspension using 0.22 part of 1,1-bis(t-butyl peroxy) cyclohexane as an initiator was heated at 90° C. for 8 hours to obtain a strongly acidic cation exchange resin. The physical properties of this resin are shown in Table 3.

EXAMPLE 8

Polymerization and sulfonation were carried out in the same manner as in Example 4, except that a monomer mixture suspension using 0.25 part of 1,1-bis(t-hexyl peroxy) cyclohexane as an initiator was heated at 90° C. for 8 hours to obtain a strongly acidic cation exchange resin. The physical properties of this resin are shown in Table 3.

EXAMPLE 9

A monomer mixture comprising 93 parts of styrene, 7 parts of divinylbenzene for industrial use (purity: 56.5%), and 0.23 part of 1,1-bis(t-butyl peroxy)-2-methylcyclohexane was added to 300 parts of deionized water having 0.5 part of polyvinyl alcohol dissolved therein, followed by stirring for 10 minutes to obtain a suspension. Then, the suspension was heated and reacted at 85° C. for 8 hours. The resulting spherical crosslinked copolymer was thoroughly washed with water to remove the dispersant, followed by vacuum drying at 50° C. for 5 hours. 81 parts of chloromethylmethylether was added to 30 parts of the spherical crosslinked copolymer thus obtained, and the mixture was maintained at room temperature for 30 minutes for swelling. Then, 15 parts of zinc chloride was added thereto, and the mixture was reacted at 50° C. for 8 hours. Then, 450 parts of deionized water was added thereto, followed by washing with water and filtration. 103 parts of deoxane and 81 parts of 30% trimethylamine aqueous solution were added to 20 parts of the above obtained chloromethylated spherical crosslinked copolymer, and the mixture was reacted at 50° C. for 8 hours, followed by washing with water and filtration to obtain a trimethylamine-type strongly basic anion exchange resin. The physical properties of this resin are shown in Table 3.

EXAMPLE 10

Polymerization, chloromethylation and amination were carried out in the same manner as in Example 9, except that a monomer mixture comprising 89 parts of styrene, 11 parts of divinylbenzene for industrial use (purity: 55.6%) and 0.23 part of 1,1-bis(t-butyl peroxy)-2-methylcyclohexane, was used, to obtain a strongly basic anion exchange resin. The physical properties of this resin are shown in Table 3.

EXAMPLE 11

Polymerization, chloromethylation and amination were carried out in the same manner as in Example 9, except that a monomer mixture comprising 86 parts of styrene, 14 parts of divinylbenzene for industrial use (purity: 55.6%) and 0.23 part of 1,1-bis(t-butyl peroxy)-2-methylcyclohexane, was used, to obtain a strongly basic anion exchange resin. The physical properties of this resin are shown in Table 3.

COMPARATIVE EXAMPLE 4

Polymerization and sulfonation were carried out in the same manner as in Example 4, except that 0.2 part of benzoyl peroxide was used instead of 1,1-bis(t-butyl peroxy)-2-methylcyclohexane to obtain a strongly acidic cation exchange resin. The physical properties of this resin are shown in Table 3.

COMPARATIVE EXAMPLE 5

Polymerization, chloromethylation and amination were carried out in the same manner as in Example 9, except that 0.2 part of benzoyl peroxide was used instead of 1,1-bis(t-butyl peroxy)-2-methylcyclohexane to obtain a strongly basic anion exchange resin. The physical properties of this resin are shown in Table 3.

COMPARATIVE EXAMPLE 6

Polymerization and sulfonation were carried out in the same manner as in Example 4, except that 0.18 part of t-butyl peroxyoctate was used instead of 1,1-bis(t-butyl peroxy)-2-methylcyclohexane to obtain a strongly acidic cation exchange resin. The physical properties of this resin are shown in Table 3.

TABLE 3

|  | Water content (%) | Ion exchange capacity (meq/g) | Ion exchange capacity (meq/ml) | Perfect beads (%) |
|---|---|---|---|---|
| Example 4 | 42.1 | 4.56 | 2.28 | 100 |
| Example 5 | 41.1 | 4.56 | 2.24 | 100 |
| Example 6 | 43.1 | 4.39 | 2.07 | 100 |
| Example 7 | 41.3 | 4.54 | 2.27 | 99.9 |
| Example 8 | 42.6 | 4.55 | 2.18 | 99.9 |
| Example 9 | 53.4 | 4.33 | 1.40 | 99 |
| Example 10 | 46.8 | 4.15 | 1.57 | 99 |
| Example 11 | 40.5 | 3.89 | 1.66 | 99 |
| Comparative Example 4 | 40.9 | 4.52 | 2.27 | 99 |
| Comparative Example 5 | 54.1 | 4.37 | 1.41 | 90 |
| Comparative Example 6 | 41.7 | 4.49 | 2.21 | 99 |

For the determination of the perfect beads, the cracked beads and the broken beads, each ion exchange resin was dispersed and a microscopic photograph was taken, whereupon the configuration of beads in an area containing about 1000 particles was visually evaluated.

EXAMPLE 12

The ion exchange resins obtained in Examples 4 to 11 and Comparative Examples 4 to 6, and a commercially available typical sulfonic acid type strongly acidic cation exchange resin (A) made of styrene-divinylbenzene type resin having substantially the same level of water content (water content: 40%) as that of Example 4, and a commercially available typical quaternary amino type strongly basic anion exchange resin (B) made of styrene-divinylbenzene type resin having substantially the same level of water content (water content: 51%) as that of Example 9, were classified into particle sizes of from 600 μm to 850 μm, respectively, in the form of a sodium salt in the case of a cation exchange resin or in the form of a chlorinated salt in the case of an anion exchange resin, and 5 ml of each resin was sampled. Each sample was packed into a column and subjected to a cycle test of passing a 8N sulfuric acid aqueous solution and a 8N sodium hydroxide aqueous solution alternately therethrough for 10 cycles.

The periods of time for passing liquids were as follows:

| 1) 8N sulfuric acid aqueous solution | 2 minutes |
|---|---|
| 2) Deionized water | 1 minute |
| 3) 8N sodium hydroxide aqueous solution | 2 minutes |
| 4) Deionized water | 1 minute |

The flow rate was a space velocity of SV=5.

The proportions of the perfect beads, the cracked beads and the broken beads were compared as, before and after the test. The results of the strongly acidic cation exchange resins are shown in Table 4, and the results of the strongly basic anion exchange resins are shown in Table 5.

TABLE 4

|  | Perfect beads before the test (%) | Perfect beads after the test (%) |
|---|---|---|
| Example 4 | 100 | 97.9 |
| Example 5 | 100 | 98.5 |
| Example 6 | 100 | 97.9 |
| Example 7 | 99 | 92.5 |
| Example 8 | 99 | 97.5 |
| Comparative Example 4 | 99 | 85 |
| Commercial Product A | 99 | 44 |
| Comparative Example 6 | 99 | 88 |

TABLE 5

|  | Perfect beads before the test (%) | Perfect beads after the test (%) |
|---|---|---|
| Example 9 | 98.5 | 85.4 |
| Example 10 | 100 | 91.7 |
| Example 11 | 98 | 81.4 |
| Comparative Example 5 | 90 | 30 |
| Commercial Product B | 99 | 30 |

EXAMPLE 13

Beads of the resin obtained in Example 5 and a commercially available sulfonic acid type strongly acidic cation exchange resin (A) were measured in respect of crash strength. A force (g) required to crash each bead was recorded and an average value of about 60 times measurements was shown in Table 6.

TABLE 6

|  | Crash strength (g/bead) |
|---|---|
| Example 5 | 2040 |
| Commercial Product A | 900 |

We claim:

1. A method for producing a spherical crosslinked copolymer, which comprises polymerizing at least one monofunctional addition-polymerizable monomer selected from the group consisting of monovinyl aromatic monomers and monovinyl aliphatic monomers and at least 0.5% by weight based on the total weight of the monomers of at least one polyfunctional addition-polymerizable monomer selected from the group consisting of polyvinyl aromatic monomers and aliphatic polyacrylic or polymethylacrylic monomers by suspension polymerization in an aqueous medium in the presence of a cycloaliphatic peroxyketal of the following formula (b) as a radical polymerization initiator which has a decomposition temperature for a half-life period of 10 hours within a range of from 60° to 120° C. and which is capable of forming at least four radical initiating points per molecule by the decomposition:

$$(R_4\!-\!\!O\!-\!\!O)_{\overline{m}}R_5 \qquad (b)$$

wherein $R_4$ is a linear or branched $C_{1\text{-}10}$ alkyl group, $R_5$ is a m-valent $C_{4\text{-}25}$ cycloaliphatic group, and m is an integer of at least 2, wherein the plurality of $R_4$ per molecule may be the same or different said polymerization initiator decomposing by two steps and the temperature difference between a first decomposition temperature and a second decomposition temperature being at least 10° C.

2. A method for producing a spherical ion exchange resin, which comprises introducing ion exchange groups into the spherical crosslinked copolymer produced by the method of claim 1.

3. The method for producing a strongly acidic cation exchange resin according to claim 2, wherein the ion exchange groups are sulfonic acid groups.

4. The method for producing a strongly acidic cation exchange resin according to claim 3, which comprises reacting a sulfonating agent selected from the group consisting of concentrated sulfuric acid, sulfonic acid and fuming sulfuric acid with the spherical crosslinked copolymer produced by the method of claim 1.

5. The method for producing a spherical anion exchange resin according to claim 2, which comprises haloalkylating the spherical crosslinked copolymer produced by the method of claim 1 by reacting a haloalkylating agent therewith in the presence of a Lewis acid, followed by reacting an alkylamine or an alkanolamine therewith.

6. The method for producing a spherical crosslinked copolymer according to claim 1, wherein the polymerization initiator is at least one member selected from the group consisting of 1,1-bis(tert-butyl peroxy)-3,3,5-trimethylcyclohexane, 1,1-bis(tert-hexyl peroxy)-cyclohexane, 1,1-bis(tert-butyl peroxy)-2-methylcyclohexane and 1,1-bis(tert-hexyl peroxy)-3,3,5-trimethylcyclohexane.

7. The method for producing a spherical crosslinked copolymer according to claim 6, wherein the polymerization initiator is 1,1-bis(tert-hexyl peroxy)-cyclohexane or 1,1-bis(tert-butyl peroxy)-2-methylcyclohexane.

8. The method for producing a spherical crosslinked copolymer according to claim 1, wherein the polymerization reaction initiates at a temperature between the first decomposition temperature and the second decomposition temperature and terminates at a temperature elevated higher than the second decomposition temperature.

9. The method for producing a spherical crosslinked copolymer according to claim 1, wherein the amount of the polyfunctional addition-polymerizable monomer is from 0.5 to 30% by weight on the basis of the total weight of monomers.

* * * * *